US012643991B2

(12) United States Patent
Pineau

(10) Patent No.: US 12,643,991 B2
(45) Date of Patent: Jun. 2, 2026

(54) MAGNETIC COMPOSITION COMPRISING A RESIN CONSISTING OF COPOLYMERS CONTAINING POLYAMIDE BLOCKS AND POLYETHER BLOCKS

(71) Applicant: ARKEMA FRANCE, Colombes (FR)

(72) Inventor: Quentin Pineau, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 494 days.

(21) Appl. No.: 18/248,807

(22) PCT Filed: Oct. 13, 2021

(86) PCT No.: PCT/FR2021/051775
§ 371 (c)(1),
(2) Date: Apr. 12, 2023

(87) PCT Pub. No.: WO2022/079387
PCT Pub. Date: Apr. 21, 2022

(65) Prior Publication Data

US 2023/0383096 A1 Nov. 30, 2023

(30) Foreign Application Priority Data

Oct. 13, 2020 (FR) ....................................... 2010449

(51) Int. Cl.
*C08K 7/18* (2006.01)
*C08J 3/20* (2006.01)

(52) U.S. Cl.
CPC ................. *C08K 7/18* (2013.01); *C08J 3/203* (2013.01); *C08J 2377/12* (2013.01); *C08K 2201/01* (2013.01)

(58) Field of Classification Search
CPC ....... C08G 69/40; C08J 2377/12; C08J 3/203; C08L 77/12; H01F 1/083; H01F 1/113
See application file for complete search history.

(56) References Cited

U.S. PATENT DOCUMENTS

| | | | | |
|---|---|---|---|---|
| 5,501,840 A * | 3/1996 | Mantovani | F16L 9/19 494/20 |
| 5,886,098 A | 3/1999 | Ueda et al. | |
| 6,300,463 B1 * | 10/2001 | Figuly | C08G 69/40 428/394 |
| 6,346,565 B1 | 2/2002 | Daifuku et al. | |
| 6,590,065 B1 | 7/2003 | Goldfinger | |
| 6,893,580 B2 | 5/2005 | Kawano et al. | |
| 2005/0165210 A1 | 7/2005 | Malet et al. | |
| 2008/0149881 A1 | 6/2008 | Park | |
| 2017/0178774 A1 | 6/2017 | Matsuda et al. | |
| 2019/0318855 A1 | 10/2019 | Lemaitre et al. | |

FOREIGN PATENT DOCUMENTS

| | | |
|---|---|---|
| EP | 0613919 A1 | 9/1994 |
| FR | 2846332 A1 | 4/2004 |
| JP | S58016509 A | 1/1983 |
| JP | H0457302 A | 2/1992 |
| JP | H08155053 A | 6/1996 |
| JP | 2001123067 A | 10/1999 |
| JP | 2004352791 A | 12/2004 |
| JP | 2005072564 A | 3/2005 |
| JP | 2009283596 A | 12/2009 |
| JP | 2019515982 A | 6/2019 |
| WO | 2018091855 A1 | 5/2018 |

OTHER PUBLICATIONS

JP H0457302 A (May 18, 1992) machine translation.*
International Search Report (PCT/ISA/210) with translation and Written Opinion (PCT/ISA/237) mailed on Feb. 11, 2022, by the European Patent Office as the International Searching Authority for International Application No. PCT/FR2021/051775.
First Office Action (with English translation) issued by The State Intellectual Property Office of People's Republic of China on Jul. 11, 2025, in related Chinese Application No. 202180070278.4, 20 pages.
Office Action (with English translation) issued by The Japanese Patent Office (JPO) on Sep. 30, 2025, in related Japanese Application No. 2023522398, 11 pages.
Office Action (English translation only) issued by The Korean Intellectual Property Office (KIPO) on Sep. 1, 2025, in related Korean Application No. 10-2023-7015836, 6 pages.
Modern Engineering Plastics Modification—Theory and Practice, Yang Mingshan et al., pp. 185-186, China Light Industry Press, 20090731 Concise Explanation of Relevance provided by First Chinese Official Action (NPL1).
Thermoplastic Elastomers, translated by Fu hifeng et al., Chemical Industry Press, pp. 232-234, 20000331 Concise Explanation of Relevance provided by First Chinese Official Action (NPL1).

* cited by examiner

*Primary Examiner* — Ana L. Woodward
(74) *Attorney, Agent, or Firm* — Boone IP Law

(57) ABSTRACT

A magnetic composition including a polyamide block- and polyether block-containing copolymer resin in which the magnetic particles are dispersed. Also, a process for preparing same and to the use of same for the manufacture of a magnet which can in particular be used for electronic or electrical applications (smartphone, tablet, etc.), for sports, automobiles or industry.

13 Claims, No Drawings

MAGNETIC COMPOSITION COMPRISING A RESIN CONSISTING OF COPOLYMERS CONTAINING POLYAMIDE BLOCKS AND POLYETHER BLOCKS

FIELD OF THE INVENTION

The present invention relates to a magnetic composition comprising a polyamide block- and polyether block-containing copolymer resin in which the magnetic particles are dispersed. The present invention also relates to the process for preparing same and to the use of same for the manufacture of a magnet which can in particular be used for electronic or electrical applications (smartphone, tablet, etc.), for sports, automobiles or industry.

TECHNICAL BACKGROUND

It is known to use polymer resins which serve as binder ("resin binder") in magnetic compositions (also referred to as "permanent magnet"). It is also known that the magnetic performance qualities require a high content of magnetic fillers, however, this reduces the mechanical properties of the composition, in particular its elongation at break property. Furthermore, the presence of the high content of magnetic fillers makes the composition viscous during its manufacture, which reduces its ability to be transformed.

Document US 2017/0178774 describes a magnetic composition comprising from 88% to 91% by mass of a magnetic powder, from 0.5-2.5% by mass of a polyamide elastomer having a tensile elongation at break of 400% and a flexural modulus of elasticity of 100 MPa or more, from 0.5% to 2% by mass of carbon fiber as reinforcing agent, from 0.3% to 1% by mass of a carboxylic acid ester, and made up to 100% by mass with a polyamide 12 resin.

Document U.S. Pat. No. 6,346,565B describes a magnetic composition comprising a binder predominantly containing a thermoplastic resin and a polyamide elastomer based on polymerized fatty acid, and a magnetic powder dispersed in the binder.

Document U.S. Pat. No. 6,893,580 B describes a composition comprising a binder and a magnetic powder, in which the binder comprises a thermoplastic resin and an aliphatic polyamide. The binder makes it possible to improve the melt flow rate, and thus to facilitate the manufacture of the composition.

There is an ongoing need to provide a magnetic composition having a high filler content of magnetic particles while retaining excellent mechanical properties, particularly in terms of elongation at break, and which can easily be transformed into a desired form.

The invention therefore seeks to provide a magnetic composition which satisfies the needs expressed above.

SUMMARY OF THE INVENTION

The invention relates firstly to a magnetic composition comprising:

from 92% to 97% by weight of at least one magnetic filler, from 3% to 8% by weight of a polyamide block- and polyether block-containing (PEBA) copolymer resin having an instantaneous hardness of less than or equal to 55 Shore D, preferably of less than or equal to 50 Shore D and, from 0% to 1% by weight of at least one additive, the total amounting to 100% by weight of the composition.

According to one embodiment, the melt viscosity of the PEBA copolymer is less than 550 Pa·s, preferably less than 400 Pa·s, even more preferentially less than 300 Pa·s.

The melt viscosity of the copolymer is measured at 240° C. according to the standard ISO 6721-10: 2015.

It has been observed that, in the context of the invention, when its melt viscosity is less than 550 Pa·s, the PEBA copolymer resin can be easily mixed with the magnetic filler in the molten state. The mixture can thus more easily be transformed to give the final part.

According to one embodiment, the at least one magnetic filler is chosen from magnetic particles based on rare earths and/or based on alnico (aluminum, nickel, cobalt) and/or based on ferrite, preferably in powder form.

According to one embodiment, the PEBA copolymer is a polyetheresteramide resulting from the polycondensation of polyamide blocks bearing dicarboxylic chain ends with polyetherdiols.

According to one embodiment, the polyamide blocks of the PEBA copolymer comprise at least one block chosen from PA 11, PA 12, PA 1112, PA 1010, PA 1012, PA6, PA 610, PA 612, copolyamides, and/or mixtures thereof, and the polyether blocks of the PEBA copolymer comprise at least one block chosen from PTMG (polytetrahydrofuran), PEG (polyethylene glycol), PPG (propylene glycol), and PO3G (polytrimethylene glycol) blocks, and/or mixtures thereof, and preferably PTMG blocks.

According to one embodiment, the PEBA copolymer comprises from 30% to 90% by weight of polyether blocks, preferably from 45% to 90%, even more preferentially from 50% to 80% by weight of polyether blocks, and from 10% to 70% by weight of polyamide blocks, preferably from 10% to 55%, even more preferentially from 20% to 50% by weight of polyamide blocks, relative to the total weight of the PEBA copolymer.

For example, the PEBA copolymer comprises from 30% to 35%, from 35% to 45%, from 45% to 55%, from 55% to 65%, from 65% to 75% or from 75% to 85% by weight of polyether blocks, relative to the total weight of the copolymer.

According to one embodiment, the at least one additive is chosen from modifiers, UV stabilizers, heat stabilizers, antioxidants, fillers, mold-release agents, pigments, coupling agents, reinforcing materials such as talc or glass fibers, lubricant, and/or mixtures thereof.

According to one embodiment, the composition of the present invention has an elongation at break value of greater than 2%.

The elongation at break in the present invention is measured according to the standard ISO 527-1.

It has been unexpectedly observed that the use of a resin of copolymers containing polyamide blocks and particular polyether blocks, as binder, made it possible to obtain magnetic compositions having, in addition to excellent magnetic power, excellent mechanical properties in terms of elongation at break, while maintaining good impact resistance.

Moreover, the magnetic composition of the present invention is easy to prepare, being able to be easily transformed during its manufacturing process.

The present invention also relates to a process for preparing a magnetic composition as described above, comprising the steps of:

(i) mixing a PEBA copolymer in the form of powder or granules with a magnetic filler, and optional additives, the mixture preferably being produced by a dry blend;

(ii) extruding the mixture obtained in step (i) to give an extrudate in the form of granules.

According to one embodiment, step (ii) is carried out in a single-screw extruder or a twin-screw extruder.

The extrusion step (ii) may be carried out through a granulation die to produce granules.

The dry blending step is particularly advantageous since it makes it possible to more easily and intimately mix compounds constituting the composition.

According to one embodiment, the process comprises a step (iii) of shaping by grinding the extrudate obtained in step (ii) to give a powder composition.

According to one embodiment, the process comprises a step (iii) of shaping by injection molding the extrudate obtained in step (ii) to give a molded object.

The process may comprise a step of applying a magnetic field to impart a desired magnetic characteristic on the extrudate during step (ii) and/or on the powder composition during step (iii) or on the molded object during step (iii). The conditions for application of the magnetic field can easily be adapted by those skilled in the art.

The invention also relates to a composition capable of being obtained according to the process as described above.

Thus, the process of the present invention makes it possible to provide a powder composition or a molded object having desired magnetic characteristics.

According to one embodiment, the magnetic composition preferably has the following properties:

maximum energy product (BH) of from 20 to 100 KJ/m$^3$, preferably from 30 to 80 KJ/m$^3$, according to MMPA STANDARD No. 0100-00; and/or remanence Br=0.3 to 1.8 T, preferably 0.5 to 0.8 T, according to MMPA STANDARD No. 0100-00; and/or Izod impact strength in the range of from 10 to 30 kJ/m$^2$ according to the standard ISO 180:2000 at 23° C.

The invention also relates to the use of the composition as defined above for the manufacture of a magnet usable in electrical or electronic parts that can be used in the field of sports (for example, an item of sports clothing, smartwatch), automobiles, medicine (for example, imaging), or industry (for example, sensors).

The invention also relates to an article consisting of or comprising at least one magnet as defined above.

Advantageously, the article is a component of sports equipment, of a sports shoe, of a smartwatch, of glasses, of furniture, of audiovisual equipment, of a computer, of automotive or aeronautical equipment and/or a component of medical, electrical, household electrical appliance, computing, electronic and/or microelectronic equipment.

DETAILED DESCRIPTION

Definition

The term "melting point" is intended to denote the temperature at which an at least partially crystalline polymer passes to the viscous liquid state, as measured by differential scanning calorimetry (DSC) according to the standard NF EN ISO 11 357-3 using a heating rate of 20° C./min.

Furthermore, the term "volume-average diameter" or "Dv" is intended to refer to the volume-average diameter of a pulverulent substance, as measured according to the standard ISO 9276—parts 1 to 6: "Representation of results of particle size analysis". Various diameters are differentiated. More specifically, the Dv50 denotes the volume-median diameter, i.e. that which corresponds to the 50$^{th}$ volume percentile, and the Dv10 and Dv90 denote respectively the volume-average diameters below which are located 10% or 90% by volume of the particles. The volume-average diameter may be measured especially by means of a laser particle size analyzer, for example a laser particle size analyzer (Sypmatec Helos). Software (Fraunhofer) can then be used to obtain the volumetric distribution of a powder and deduce therefrom the Dv10, Dv50 and Dv90.

PEBA Copolymer

The PEBA copolymer of the invention has an instantaneous hardness of less than or equal to 55 Shore D, preferably of less than or equal to 50 Shore D, even more preferentially of less than or equal to 45 Shore D. The hardness measurements are carried out according to the standard ISO 868:2003.

The PEBA copolymer of the invention is a polyetheresteramide resulting from the polycondensation of polyamide blocks bearing dicarboxylic chain ends with polyetherdiols.

The polyamide blocks bearing dicarboxylic chain ends originate, for example, from the condensation of polyamide precursors in the presence of a chain-limiting dicarboxylic acid.

The number-average molar mass Mn of the polyamide blocks is between 400 and 20 000 g/mol and preferably between 500 and 10 000 g/mol.

The polymers containing polyamide blocks and polyether blocks may also comprise randomly distributed units.

Three types of polyamide blocks may advantageously be used.

According to a first type, the polyamide blocks originate from the condensation of a dicarboxylic acid, in particular those having from 4 to 20 carbon atoms, preferably those having from 6 to 18 carbon atoms, and of an aliphatic or aromatic diamine, in particular those having from 2 to 20 carbon atoms, preferably those having from 5 to 14 carbon atoms.

As examples of dicarboxylic acids, mention may be made of 1,4-cyclohexanedicarboxylic acid, butanedioic acid, adipic acid, azelaic acid, suberic acid, sebacic acid, dodecanedicarboxylic acid, octadecanedicarboxylic acid, terephthalic acid and isophthalic acid.

As examples of diamines, mention may be made of tetramethylenediamine, hexamethylenediamine, 1,5-pentanediamine, 1,10-decamethylenediamine, dodecamethylenediamine, trimethylhexamethylenediamine, the isomers of bis(4-aminocyclohexyl) methane (BACM), bis(3-methyl-4-aminocyclohexyl)methane (BMACM) and 2,2-bis(3-methyl-4-aminocyclohexyl)propane (BMACP), and para-aminodicyclohexylmethane (PACM), and isophoronediamine (IPDA), 2,6-bis(aminomethyl)norbornane (BAMN) and piperazine (Pip).

As regards the polyamide block, the standard NF EN ISO 1874-1:2011 defines a nomenclature for polyamides. In the present description, the term "monomer" should be taken as meaning "repeating unit". A special case is where a repeating unit of the polyamide consists of the combination of a diacid with a diamine. It is considered that it is the combination of a diamine and of a diacid, i.e. the "diamine diacid", also called "XY", pair, in equimolar amount, which corresponds to the monomer. This is explained by the fact that, individually, the diacid or the diamine is only a structural unit, which is not enough by itself to polymerize.

Examples thereof are the blocks PA412, PA414, PA418, PA610, PA612, PA614, PA618, PA912, PA1010, PA1012, PA1014 and PA1018.

According to a second type, the polyamide blocks result from the condensation of one or more α,ω-aminocarboxylic acids and/or of one or more lactams having from 6 to 12 carbon atoms in the presence of a dicarboxylic acid having from 4 to 12 carbon atoms or of a diamine.

As examples of lactams, mention may be made of caprolactam, oenantholactam and lauryllactam.

As examples of α,ω-aminocarboxylic acids, mention may be made of aminocaproic acid, 7-aminoheptanoic acid, 11-aminoundecanoic acid and 12-aminododecanoic acid. Advantageously, the polyamide blocks of the second type are made of polyamide 11, polyamide 12 or polyamide 6.

According to a third type, the polyamide blocks result from the condensation of at least one α,ω-aminocarboxylic acid (or a lactam), at least one diamine and at least one dicarboxylic acid.

In this case, the polyamide PA blocks are prepared by polycondensation:

- of the linear aliphatic or aromatic diamine(s) having X carbon atoms;
- of the dicarboxylic acid(s) having Y carbon atoms; and
- of the comonomer(s) {Z}, chosen from lactams and α,ω-aminocarboxylic acids having Z carbon atoms and equimolar mixtures of at least one diamine having X1 carbon atoms and of at least one dicarboxylic acid having Y1 carbon atoms, (X1, Y1) being different from (X, Y);
- said comonomer(s) {Z} being introduced in a weight proportion ranging up to 50%, preferably up to 20%, even more advantageously up to 10%, relative to the total amount of polyamide-precursor monomers;
- in the presence of a chain limiter chosen from dicarboxylic acids.

Advantageously, the dicarboxylic acid having Y carbon atoms is used as chain limiter, which is introduced in excess relative to the stoichiometry of the diamine(s).

According to one variant of this third type, the polyamide blocks result from the condensation of at least two α,ω-aminocarboxylic acids or of at least two lactams having from 6 to 12 carbon atoms or of one lactam and one aminocarboxylic acid not having the same number of carbon atoms, in the optional presence of a chain limiter.

As examples of aliphatic α,ω-aminocarboxylic acids, mention may be made of aminocaproic acid, 7-aminoheptanoic acid, 11-aminoundecanoic acid and 12-aminododecanoic acid. As examples of lactams, mention may be made of caprolactam, oenantholactam and lauryllactam. As examples of aliphatic diamines, mention may be made of hexamethylenediamine, dodecamethylenediamine and trimethylhexamethylenediamine. As examples of cycloaliphatic diacids, mention may be made of 1,4-cyclohexanedicarboxylic acid. As examples of aliphatic diacids, mention may be made of butanedioic acid, adipic acid, azelaic acid, suberic acid, sebacic acid, dodecanedicarboxylic acid and polyoxyalkylene-α,ω-diacids. As examples of aromatic diacids, mention may be made of terephthalic acid (T) and isophthalic acid (I). As examples of cycloaliphatic diamines, mention may be made of the isomers of bis(4-aminocyclohexyl)methane (BACM), bis(3-methyl-4-aminocyclohexyl) methane (BMACM), and 2,2-bis(3-methyl-4-aminocyclohexyl)propane (BMACP), and para-aminodicyclohexylmethane (PACM). The other diamines commonly used may be isophoronediamine (IPDA), 2,6-bis (aminomethyl)norbornane (BAMN) and piperazine.

In the case where the PA blocks of the PEBA according to the invention comprise at least two different monomers, called "comonomers", i.e. at least one monomer and at least one comonomer (monomer other than the first monomer), they comprise a copolymer, such as a copolyamide, abbreviated as CoPA.

As examples of polyamide blocks of the third type, mention may be made of the following:

- 66/6 in which 66 denotes hexamethylenediamine units condensed with adipic acid. 6 denotes units resulting from the condensation of caprolactam.
- 66/610/11/12 in which 66 denotes hexamethylenediamine condensed with adipic acid. 610 denotes hexamethylenediamine condensed with sebacic acid. 11 denotes units resulting from the condensation of aminoundecanoic acid. 12 denotes units resulting from the condensation of lauryllactam.

The mass Mn of the polyether blocks is between 100 and 6000 g/mol and preferably between 200 and 3000 g/mol.

According to a preferred embodiment, the rigid polyamide block, in the copolymer containing rigid PA blocks and polyether blocks according to the invention, comprises at least one of the following polyamide units: 11, 12, 6, 610, 612, 1010, 1012, 1112, and mixtures or copolyamides thereof.

The polyether PE blocks consist of alkylene oxide units. These units may be, for example, ethylene oxide units, propylene oxide units or tetrahydrofuran (which leads to polytetramethylene glycol sequences). Use is thus made of PEG (polyethylene glycol) blocks, i.e. blocks consisting of ethylene oxide units, PPG (propylene glycol) blocks, i.e. blocks consisting of propylene oxide units, PO3G (polytrimethylene glycol) blocks, i.e. blocks consisting of polytrimethylene glycol ether units (such copolymers with polytrimethylene ether blocks are described in the document U.S. Pat. No. 6,590,065), and PTMG blocks, i.e. blocks consisting of tetramethylene glycol units, also known as polytetrahydrofuran. The PEBA copolymers may comprise in their chain several types of polyethers, the copolyethers possibly being in block or random form.

Use may also be made of blocks obtained by oxyethylation of bisphenols, for instance bisphenol A. The latter products are described in patent EP613919.

The polyether blocks may also consist of ethoxylated primary amines. As examples of ethoxylated primary amines, mention may be made of the products of formula:

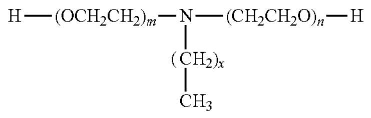

in which m and n are between 1 and 20, and x is between 8 and 18. These products are commercially available under the brand name Noramox® from the company CECA and under the brand name Genamin® from the company Clariant.

The polyetherdiol blocks are either used as such and copolycondensed with polyamide blocks bearing carboxylic end groups. The general method for the two-step preparation of PEBA copolymers containing ester bonds between the PA blocks and the PE blocks is known and is described, for example, in French patent FR 2 846 332. The polyether blocks may also be mixed with polyamide precursors and a chain-limiting diacid to prepare polymers containing polyamide blocks and polyether blocks having randomly distributed units (one-step process).

Needless to say, the name PEBA in the present description of the invention relates equally well to the Pebax® products sold by Arkema, to the Vestamid® products sold by Evonik® and to the Grilamid® products sold by EMS, or to any other PEBA from other suppliers.

According to one embodiment, the PEBA copolymers contain PA blocks of PA 6, of PA 11, of PA 12, of PA 610, of PA 612, of PA 1010, of PA 1012 and/or of PA 1112, preferably PA 11 and/or PA 12 blocks; and PE blocks of PTMG, of PEG, of PPG and/or of PO3G. The PEBAs based on PE blocks predominantly consisting of PEG are to be categorized in the range of hydrophilic PEBAs. The PEBAs based on PE blocks predominantly consisting of PTMG are to be categorized in the range of hydrophobic PEBAs.

Advantageously, said PEBA used in the composition according to the invention is at least partially obtained from biobased starting materials.

The term "starting materials of renewable origin" or "biobased starting materials" means materials which comprise biobased carbon or carbon of renewable origin. Specifically, unlike materials resulting from fossil substances, materials composed of renewable starting materials contain $^{14}C$. The "content of carbon of renewable origin" or "content of biobased carbon" is determined by application of the standards ASTM D 6866 (ASTM D 6866-06) and ASTM D 7026 (ASTM D 7026-04). By way of example, the PEBAs based on polyamide 11 at least partly originate from biobased starting materials and have a content of biobased carbon of at least 1%, which corresponds to a $^{12}C/^{14}C$ isotope ratio of at least $1.2\times10^{-14}$. Preferably, the PEBAs comprise at least 50% by mass of biobased carbon relative to the total mass of carbon, which corresponds to a $^{12}C/^{14}C$ isotope ratio of at least $0.6\times10^{-12}$. This content is advantageously higher, notably up to 100%, which corresponds to a $^{12}C/^{14}C$ isotope ratio of $1.2\times10^{-12}$, in the case, for example, of PEBA containing PA 11 blocks and PE blocks comprising PO3G, PTMG and/or PPG, preferably PTMG, resulting from starting materials of renewable origin.

Magnetic Fillers

The term "magnetic filler" is intended to mean, for the purposes of the invention, the magnetic particles based on rare earths and/or based on alnico (aluminum, nickel, cobalt) and/or based on ferrite.

Preferably, the magnetic particles have a Dv50 in the range from 0.1 to 100 μm.

As ferrite particles, use may be made of magnetoplumbite-type ferrite particles. Specific examples of magnetoplumbite-type ferrite particles may include barium ferrite particles, strontium ferrite particles and barium-strontium ferrite particles, which are represented by the formula: $AO_nFe_2O_3$ (where A is Ba, Sr or Ba—Sr; n=5.0 to 6.5), and also particles obtained by incorporating, into these ferrite particles, at least one element chosen from the group consisting of Ti, Mn, Al, La, Zn, Bi and Co in an amount of preferably from 0.1 to 7.0 mol %.

The ferrite particles preferably have an average particle diameter of preferably from 0.05 to 300 μm, more preferably from 1 to 100 μm, a coercive force IHc of preferably from 119 to 557 kA/m (1500 to 7000 Oe), better still from 119 to 398 kA/m (1500 to 5000 Oe); and a residual magnetization value of preferably from 100 to 300 mT (1000 to 3000 G), better still from 100 to 200 mT (1000 to 2000 G).

Preferably, the magnetic ferrite particles are strontium ferrite particles.

Rare-earth magnetic particles are metal compound particles composed of at least one rare earth element (for example neodymium) and at least one transition metal.

Examples of rare-earth magnetic particles may include magnetic particles such as cobalt-based rare-earth particles, rare earth-iron-boron-based particles and rare earth-iron-nitrogen-based particles. Among these rare-earth magnetic particles, rare earth-iron-boron-based particles and rare earth-iron-nitrogen-based particles are particularly preferred. Preferably, the rare-earth magnetic particles are neodymium-iron-boron (Nd—Fe—B)-based particles.

The rare-earth magnetic particles preferably have a Dv50 of preferably from 0.05 to 300 μm, more preferably from 1 to 100 μm, and a coercive force IHc of preferably from 239 to 1591 kA/m (3.0 to 20 kOe), better still from 318 to 1114 kA/m (4.0 to 15 kOe); and a residual magnetization value of preferably from 0.3 to 1.8 mT (3.0 to 18 kG), more preferably from 0.5 to 1.3 mT (5.0 to 13 kG).

Advantageously, the magnetic particles used may optionally have been subjected to various surface treatments beforehand in order to avoid deterioration in their magnetic properties due to oxidation.

According to one embodiment, the surfaces of the magnetic particles are treated with silane-based coupling agents, titanium-based coupling agents, aluminum-based coupling agents, siloxane polymers, surface treatment agents based on organic phosphoric acid, inorganic phosphoric agents, preferably silane-based coupling agents.

The magnetic composition may comprise additives usable in the field of magnets, preferably chosen from modifiers, UV stabilizers, heat stabilizers, antioxidants, fillers, mold-release agents, pigments, coupling agents, reinforcing materials such as talc or glass fibers, and/or lubricant.

Preparation Process

According to one embodiment, a temperature greater by at least 5° C., preferably greater by at least 10° C., with respect to the melting point of the PEBA copolymer, is applied in the extrusion step (ii). This temperature should generally remain below 300° C., so as to avoid thermal degradation of the copolymer of the invention.

In the context of the present invention, one or more PEBA copolymers can be introduced. When a single PEBA copolymer is used, the temperature applied in step (ii) is greater by at least 5° C., preferably greater by at least 30° C., with respect to the melting point of the copolymer. When several copolymers are used, the temperature applied is greater by at least 5° C., preferably greater by at least 30° C., with respect to the highest melting point of the copolymers.

According to one embodiment, the temperature applied in step (ii) of extrusion in the molten state is greater than 180° C. and less than 300° C.

The invention claimed is:

1. A magnetic composition comprising:

from 92% to 97% by weight of at least one magnetic filler, from 3% to 8% by weight of a polyamide block- and polyether block-containing (PEBA) copolymer resin having an instantaneous hardness of less than or equal to 55 Shore D, and, from 0% to 1% by weight of at least one additive, the total amounting to 100% by weight of the composition, wherein the melt viscosity of the PEBA copolymer is less than 550 Pa·s.

2. The composition as claimed in claim 1, wherein the at least one magnetic filler is chosen from magnetic particles based on rare earths and/or based on alnico (aluminum, nickel, cobalt) and/or based on ferrite.

3. The composition as claimed in claim 1, wherein the PEBA copolymer is a polyetheresteramide resulting from the polycondensation of polyamide blocks bearing dicarboxylic chain ends with polyetherdiols.

4. The composition as claimed in claim 1, wherein the polyamide blocks of the PEBA copolymer comprise at least one block chosen from PA 11, PA 12, PA 1112, PA 1010, PA 1012, PA 6, PA 610, PA 612, copolyamides, and/or mixtures thereof, and the polyether blocks of the PEBA copolymer comprise at least one block chosen from PTMG (polytetrahydrofuran), PEG (polyethylene glycol), PPG (propylene glycol), and PO3G (polytrimethylene glycol) blocks, and/or mixtures thereof.

5. The composition as claimed in claim 1, wherein the PEBA copolymer comprises from 30% to 90% by weight of polyether blocks, and from 10% to 70% by weight of polyamide blocks, relative to the total weight of the copolymer.

6. The composition as claimed in claim 1, wherein the at least one additive is chosen from UV stabilizers, heat stabilizers, antioxidants, fillers, mold-release agents, pigments, coupling agents, reinforcing materials, and lubricant.

7. The composition as claimed in claim 1, having an elongation at break of greater than 2%.

8. A process for preparing a composition as claimed in claim 1, comprising the steps of:

(i) mixing a PEBA copolymer in the form of powder or granules with a magnetic filler, and optional additives;

(ii) extruding the mixture obtained in step (i) to give an extrudate in the form of granules.

9. The process as claimed in claim 8, comprising a step (iii) of shaping by grinding the extrudate obtained in step (ii) to give a powder composition; or by injection molding the extrudate obtained in step (ii) to give a molded object.

10. The process as claimed in claim 9, comprising a step of applying a magnetic field to impart a desired magnetic characteristic on the extrudate during step (ii) or on the powder composition during step (iii) or on the molded object during step (iii).

11. A composition obtained by the process of claim 8.

12. A method comprising manufacturing a magnet usable in electrical or electronic parts that can be used in the field of sports, automobiles, or medicine, the method comprising manufacturing the magnet by injection molding the composition of claim 1.

13. An article consisting of or comprising at least one magnet as described in claim 12, the article being a component of sports equipment, of a sports shoe, of a smartwatch, of glasses, of furniture, of audiovisual equipment, of a computer, of automotive or aeronautical equipment, a household electrical appliance, and computing, electronic and/or microelectronic equipment.

* * * * *